US008508546B2

(12) United States Patent
Wilensky

(10) Patent No.: US 8,508,546 B2
(45) Date of Patent: Aug. 13, 2013

(54) IMAGE MASK GENERATION

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1700 days.

(21) Appl. No.: 11/524,219

(22) Filed: Sep. 19, 2006

(65) Prior Publication Data

US 2008/0069444 A1 Mar. 20, 2008

(51) Int. Cl.
*G09G 5/02* (2006.01)

(52) U.S. Cl.
USPC ........................................................ 345/592

(58) Field of Classification Search
USPC ........................................................ 345/592
See application file for complete search history.

(56) References Cited

U.S. PATENT DOCUMENTS

| | | | |
|---|---|---|---|
| 5,951,713 A * | 9/1999 | Liguori | 345/589 |
| 5,982,939 A | 11/1999 | Van Hook | |
| 6,078,619 A * | 6/2000 | Monro et al. | 375/240 |
| 6,337,925 B1 * | 1/2002 | Cohen et al. | 382/199 |
| 6,404,936 B1 | 6/2002 | Katayama et al. | |
| 6,876,361 B2 * | 4/2005 | Venkataraman | 345/424 |
| 6,894,704 B1 | 5/2005 | Bourdev et al. | |
| 2004/0008886 A1 | 1/2004 | Boykov | |
| 2004/0100477 A1 | 5/2004 | Morita et al. | |
| 2006/0055709 A1 | 3/2006 | Robinson et al. | |
| 2006/0159342 A1 | 7/2006 | Sun et al. | |

OTHER PUBLICATIONS

Morse, Bryan S., et al., "Image Magnification Using Level-Set Reconstruction." Department of Computer Science, Brigham Young University 3361 TMCB, Provo, UT 84602, 8 pages.
Saad, Yousef, "Iterative Methods for Sparse Linear Systems," PWS Publishing Company, a division of International Thomson Publishing, Inc. (1996).
Sethian, J. A., "Level Set Methods and Fast Marching Methods." Cambridge University Press, 1999, p. 73-74.
Wilensky, G. et al., "Improving Image Masks", Pending U.S. Appl. No. 11/607,208, filed Dec. 1, 2006 [786001].
International Search Report for PCT Application No. PCT/US07/78807.
Boykov, Y. et al., "Iterative Graph Cuts for Optimal Boundary & Region Segmentation of Objects in N-D Images", *Proceedings of "International Conference on Computer Vision"*, I:105-112, Vancouver, Canada (Jul. 2001).
Collins, T., "Graph Cut Matching In Computer Vision", http://homepages.inf.ed.ac.uk/rbf/CVonline/LOCAL_COPIES/AV0405/COLLINS/TobyCollinsAV Assign2.pdf, 9 pages (Feb. 2004).
Geman, S. et al., "Stochastic Relaxation, Gibbs Distributions, and the Bayesian Restoration of Images", *IEEE Transactions on Pattern Analysis and Machine Intelligence*, vol. PAMI-6, No. 6, pp. 721-741 (Nov. 1984).

(Continued)

*Primary Examiner* — Aaron M Richer
(74) *Attorney, Agent, or Firm* — Schwegman, Lundberg & Woessner, P.A.

(57) ABSTRACT

Methods, systems, and apparatus, including computer program products feature identifying a first plurality of pixels in a raster image as foreground pixels and a distinct second plurality of pixels in the raster image as background pixels. Each of the foreground and background pixels have a respective color value. The color values of the foreground pixels and the color values of the background pixels are used to solve for a color model of opacity. The color model of opacity is used to determine an opacity value for a pixel in the raster image.

63 Claims, 9 Drawing Sheets

(56) References Cited

OTHER PUBLICATIONS

Kohli, P. et al., "Efficiently Solving Dynamic Markov Random Fields using Graph Cuts", http://cms.brookes.ac.uk/staff/PushmeetKohli/papers/pushmeet-dynamic.pdf, *Proceedings of the Tenth IEEE International Conference on Computer Vision*, 8 pages (2005).

Levin, A. et al., "A Closed Form Solution to Natural Image Matting", http://www.cs.huji.ac.il/~alevin/papers/Matting-Levin-Lischinski-Weiss-CVPR06.pdf, *IEEE Conf. on Computer Vision and Pattern Recognition (CVPR)*, New York, 8 pages, (Jun. 2006).

Levin, A. et al., "Colorization using Optimization", http://www.cs.huji.ac.il/~alevin/papers/colorization-siggraph04.pdf, *SIGGRAPH, ACM Transactions on Graphics*, 6 pages (Aug. 2004).

Lombaert, H. et al., "A Multilevel Banded graph Cuts Method for Fast Image Segmentation", *Proceedings of the Tenth' IEEE International Conference on Computer Vision (ICCCV'05)*, 1:259-265 (2005).

Mortensen, E., "Simultaneous multi-frame subpixel boundary definition using toboggan-based intelligent scissors for image and movie editing—A dissertation submitted to the faculty of Brigham Young University for the degree of Doctor of Philosophy", Department of Computer Science, Brigham Young University, pp. 105-153 (Sep. 2000).

Mortensen, E. et al., "Interactive Segmentation with Intelligent Scissors", *Graphical Models and Image Processing*, 60:349-384 (1998).

Reese, L., "Intelligent Paint: Region-Based Interactive Image Segmentation—A thesis submitted to the faculty of Brigham Young University for the degree of Master of Science", Department of Computer Science, Brigham Young University, 157 pages (Aug. 1999).

Rother, C. et al., "GrabCut—Interactive Foreground Extraction using Iterated Graph Cuts", http://research.microsoft.com/vision/cambridge/papers/siggraph04.pdf, ACM Transactions on Graphics (SIGGRAPH'04), Microsoft Research Cambridge, UK, 6 pages (2004).

Wang, J. et al., "An Iterative Optimization Approach for Unified Image Segmentation and Matting", *Proceedings of the Tenth IEEE International Conference on Computer Vision (ICCCV'05)*, 8 pages (2005).

Wilensky, G. et al., "Live Coherent Image Selection", Pending U.S. Appl. No. 11/517,189 filed, Sep. 6, 2006.

Xiao, J. et al., "Motion Layer Extraction in the Presence of Occlusion using graph Cut", *Oral Presentation at the IEEE Conference on Computer Vision and Pattern Recognition, CVPR 2004*, 8 pages (2004).

Boykov, Y. et al., "Interactive Organ Segmentation Using Graph Cuts," Medical Image Computing and Computer-Assisted Intervention, MIC CAI 2000 Lecture Notes in Computer Science; LNCS, Springer-Verlag, BE, vol. 1935, Jan. 1, 2004, pp. 276-286.

Tan, K. et al., "A representation of image structure and its application to object selection using freehand sketches," Proceedings 2001 IEEE Conference on Computer Vision and Pattern Recognition. CVPR 2001. Dec. 8-14, 2001; vol. 2, Dec. 8, 2001, pp. 677-683.

Tan, K. et al., "Selecting objects with freehand sketches," Proceedings of the Eight IEEE International Conference on Computer Vision (ICCV), Vancouver, British Columbia, CA, Jul. 7-14, 2001; vol. 1, Jul. 7, 2001, pp. 337-444.

International Search Report for PCT Application No. PCT/US2007/074022 mailed Jun. 27, 2008.

Eismann, K., "Photoshop Masking & Compositing", 2005, USA, 11 pages.

Evening, M., "Adobe Photoshop CS2 for Photographers", 2005, 24 pages.

International Preliminary Report on Patentability for PCT Application No. PCT/US2007/074022, mailed Jan. 27, 2009, 9 pages.

International Search Report and Written Opinion for PCT Application No. PCT/US2007/79090, mailed Sep. 16, 2008, 17 pages.

Mumford, D. et al., "Optimal Approximations by Piecewise Smooth Functions and Associates Variational Problems," Communication on Pure and Applied Mathematics, vol. XLII, pp. 577-685 (1989).

* cited by examiner

IMAGE MASK GENERATION

BACKGROUND

The present disclosure relates to graphical image processing and, in particular, selecting parts of an image.

Typically, for each pixel in an image, an image mask indicates whether each pixel is selected. Image masks are sometimes referred to as image mattes, selection masks or alpha channels. A binary mask is an image mask that can be used to indicate one of two mutually exclusive states for each pixel: selected or not selected, foreground or background, etc. An opacity mask, sometimes referred to as a graded opacity mask, is an image mask that indicates the degree to which each pixel is in one of the two mutually exclusive states. The opacity mask can be used to indicate, for example, that some pixels are completely foreground or completely background, while other pixels are mostly foreground and slightly background. The degree to which a given pixel is identified by the opacity mask as foreground can be referred to as the pixel's opacity with respect to the opacity mask.

An opacity mask is often used to select areas of an image that depict objects that have soft edges (e.g., edges that blend with other depicted objects or the background). Typically such objects include hair, fur, feathers, fire, smoke, and so forth. An opacity mask can be generated from a binary mask by artificially feathering or softening (e.g., blurring) the edges of the binary mask. However, the resultant opacity mask will typically feature uniformly softened edges that do not reflect the features (e.g., edges) depicted in the image.

An opacity mask can be generated for an image by selecting a range of colors. The range of colors can be used to determine whether the opacity mask identifies a pixel in the image as foreground or background. For example, a range of colors that includes shades of blue can be used to generate an opacity mask that identifies an opacity value for each pixel based on the amount of blue in the pixel. Completely blue pixels are foreground, completely red or green pixels, for example, are identified as background. However, this technique will typically yield an opacity mask that does not fully include the desired area (e.g., the complete central figure without duplicate copies 140 of the figure), as is evident in the opacity mask for image 100 depicted in FIG. 1. In image 100, pixels are highlighted in a white hue in proportion to the extent that their opacity values indicate that they are background pixels. The original image, without masking is shown in FIG. 2. In image 100, note that although some areas 130 have opacity values correctly identifying foreground areas, other areas, such as the character's eyes, 110 are undesirably identified as background. Users typically select color ranges through a cumbersome trial and error process that relies on inspecting individual color channels (e.g., red, green and blue) or a combination of color channels, using their expert judgment to select a color range, and evaluating the resultant opacity mask.

SUMMARY

In general, in one aspect, embodiments feature identifying a first plurality of pixels in a raster image as foreground pixels and a distinct second plurality of pixels in the raster image as background pixels. Each of the foreground and background pixels have a respective color value. The color values of the foreground pixels and the color values of the background pixels are used to solve for a color model of opacity. The color model of opacity is used to determine an opacity value for a pixel in the raster image. Other embodiments of this aspect include corresponding systems, apparatus, and computer program products.

These and other embodiments can optionally include one or more of the following features. The color model of opacity can be non-linear. The color value of a pixel can include non-local information based on the color value of pixels in a local neighborhood around the pixel. An opacity mask for the raster image can be produced based on the opacity value of each pixel in the raster image. Solving for the color model of opacity can include identifying a function taking the color value of a given pixel as an argument and the function's value being the opacity value of the given pixel where the function is a sum of a plurality of terms, each term being the product of a respective undetermined coefficient and a respective monomial having one or more variables corresponding to each component of the given pixel's color value; and deriving a color model of opacity by determining the value of each coefficient in the function, the deriving based on the color values of the foreground and background pixels. Determining the opacity value for the pixel in the raster image using the color model of opacity can include evaluating the color model of opacity using the pixel's color value.

Solving for the color model of opacity can include using a bias to favor either the color values of foreground pixels or the color values of background pixels. User input determining the bias can be received. User input specifying a complexity of the color model of opacity can be received. The complexity of the color model of opacity can be used to determine the number of color combinations used in the color model of opacity. Pixels in the raster image can be coherently classified as either foreground or background based on the color model of opacity.

Identifying the first plurality of pixels in the raster image can include receiving user input identifying pixels from the image as the first plurality of pixels. Identifying the distinct second plurality of pixels in the raster image can include one or more of the following steps: 1) receiving user input identifying pixels from the image as the second plurality of pixels; 2) selecting pixels along the border of the image as the second plurality of pixels; 3) selecting pixels by random sample as the second plurality of pixels; and 4) selecting pixels as the second plurality of pixels whose color values are most unlike the color value of pixels in the first plurality of pixels.

In general, in another aspect, embodiments feature receiving user input identifying a first plurality of pixels in a raster image as one of foreground pixels or background pixels. Each of the pixels in the raster image has a respective color value. A distinct second plurality of pixels in the raster image is identified as the other of the foreground pixels or the background pixels. A color model of opacity is solved for using the color values of the foreground pixels and the color values of the background pixels. An opacity mask for the raster image is produced using the color model of opacity to determine a respective opacity value for each of the pixels of the raster image. Other embodiments of this aspect include corresponding systems, apparatus, and computer program products.

These and other embodiments can optionally include one or more of the following features. The color model of opacity can be non-linear. Solving for the color model of opacity can include identifying a function taking the color value of a given pixel as an argument and the function's value being the opacity value of the given pixel where the function is a sum of a plurality of terms, each term being the product of a respective undetermined coefficient and a respective monomial having one or more variables corresponding to each component of the given pixel's color value; and deriving a color model of opacity by determining the value of each coefficient in the function, the deriving based on the color values of the foreground and background pixels. Determining the opacity value for a pixel in the raster image using the color model of opacity can include evaluating the color model of opacity using the pixel's color value. A presentation of the raster image on a display can be updated to depict the opacity mask as the first plurality of pixels are being identified. Receiving user input identifying the first plurality of pixels can include receiving a stroke drawn over the image. Each pixel covered by the stroke drawn over the image can be in the first plurality of pixels. Identifying the distinct second plurality of pixels in the raster image can include one or more of the following steps: 1) receiving user input identifying pixels from the image as the second plurality of pixels; 2) selecting pixels along the border of the image as the second plurality of pixels; 3) selecting pixels by random sample as the second plurality of pixels; and 4) selecting pixels as the second plurality of pixels whose color values are most unlike the color value of pixels in the first plurality of pixels.

Particular embodiments of the subject matter described in this specification can be implemented to realize one or more of the following advantages. An opacity mask that is responsive to the pixels identified by users can be determined quickly and accurately. The user need not identify both foreground and background pixels as the opacity mask can be generated with a single identification of either background or foreground pixels. Generating an opacity mask from a color model of opacity essentially automates the laborious trial and error process often practiced by users using conventional color range selection techniques. The complexity of the color model of opacity (e.g., the number of terms) can be manipulated by users, affording further control to users, particular between accuracy and performance. A non-linear color model of opacity can produce high quality opacity masks even for an image that contains predominantly three or more colors. Using a non-linear color model of opacity is efficient enough that a visual rendering of the determined image mask can be responsive to user input while input is received, thus making opacity mask determination an interactive process.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 2:
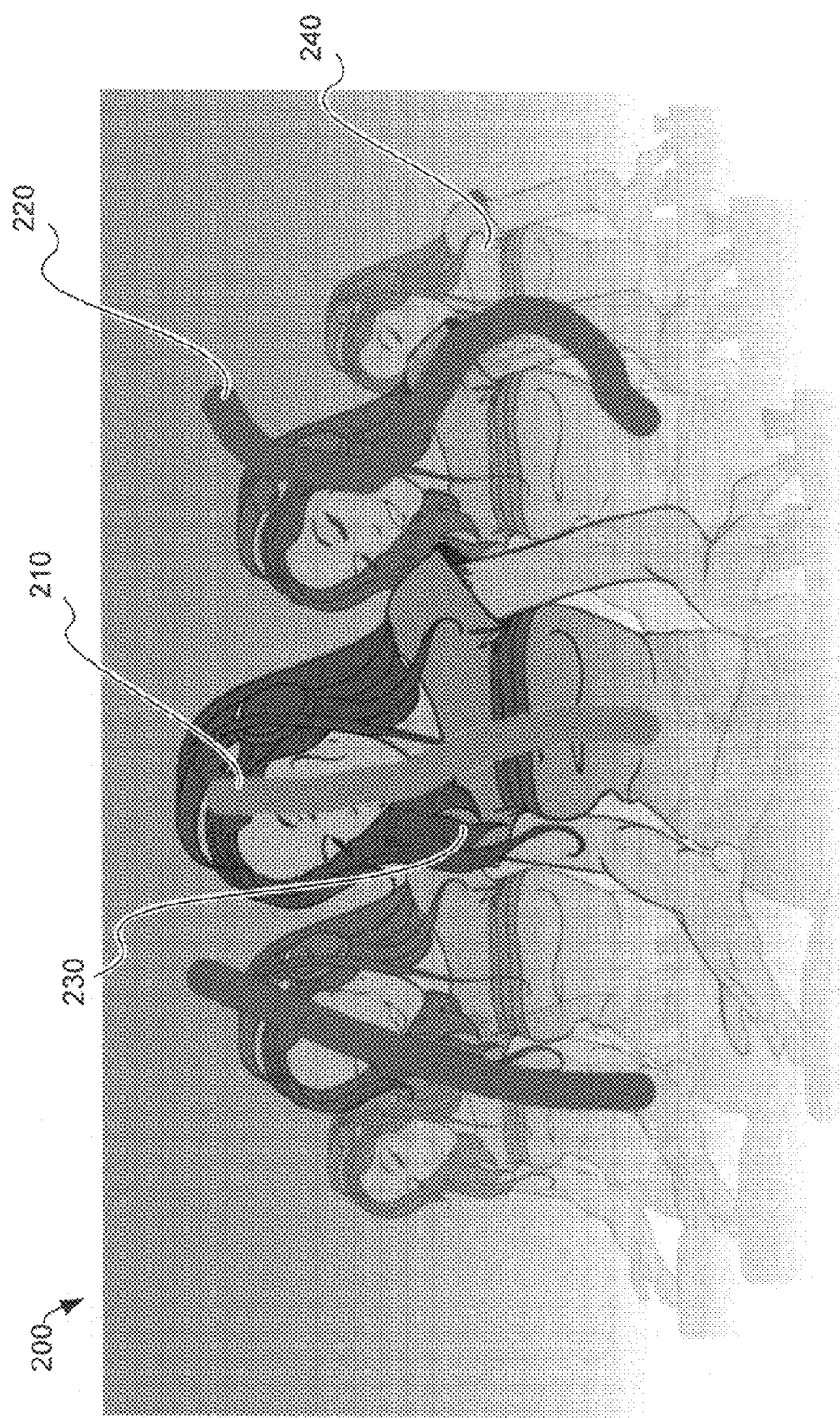
FIG. 2 illustrates an image with foreground and background brushstrokes.

FIG. 2 illustrates an image 200 with foreground 210 and background 220 brushstrokes, wherefrom an opacity mask can be generated. An image can be represented as a raster of pixels (e.g., a two dimensional array of pixels), where each pixel encodes values (e.g., color, intensity, or both) that describe the image at a particular location. Color images are typically encoded in a color model such as the RGB color model (Red Green Blue) or CMYK color model (Cyan Magenta Yellow Key). Black and white, or grayscale images can be encoded so that each pixel value refers to the intensity of grey. Other color or grayscale encodings are also possible (e.g., CIELAB, CIE XYZ, CIE LUV, YCC, YIQ, HSB or HSL). A value of a pixel corresponds to respective color components of the color model in which the image is encoded. For example, in an RGB encoded image, each pixel's value is encoded by at least three values corresponding to each of RGB's three color components: red, green and blue.

Typically an image and its constituent pixels are described by and stored in a file having an image format such as the Joint Photographic Expert Group (JPEG) format, Portable Network Graphics (PNG) format, Graphic Interchange Format (GIF) format, Bitmap (BMP) format, Tagged Image File Format (TIFF) format, and others.

Separate brushstrokes 210 and 220 are shown superimposed on the image 200 and represent the user's intention to remove duplicate copies of the central figure (e.g., the figure covered by the brushstroke 210). The pixels that have been covered by a brushstroke are identified as being pixels in one of the two states represented by the opacity mask (e.g., foreground or background). For example, brushstroke 210 identifies foreground pixels while brushstrokes 220 identify background pixels.

In general, any number of pixels in the image can be identified as background or foreground, for example, by users manipulating an input device. For example, users can draw a brushstroke 210 over the image 200 using a computer mouse, a touch sensitive screen, track pad, pressure sensitive tablet or another input device. Alternatively, pixels can be identified as either foreground or background by a system automatically (e.g., based on identifications made by motion detection, edge detection or machine vision systems). Users can denote whether the input they are providing identifies foreground or background pixels by selecting an opacity state (e.g., toggling a foreground/background button) or by altering the manner of input (e.g., using left or right mouse button), for example.

In response to identifying pixels in the image, visual feedback can be provided to users that visually emphasize the identified pixels. For example, the pixels covered by the foreground brushstroke 210 are highlighted (e.g., coloring them brightly). Pixels that have been identified as background (e.g., brushstrokes 220) can be highlighted in an alternative color. In other implementations, identified pixels can be depicted with a semi-transparent hue that highlights or obfuscates the identified pixels. Alternatively, the boundary around a contiguous area of identified pixels can be presented (e.g., as a semi-transparent outline or as an animated dotted line).

In other implementations, a visual depiction of the opacity mask that is generated in response to identifying pixels can be presented in lieu of emphasizing only the identified pixels.

Figure 1:
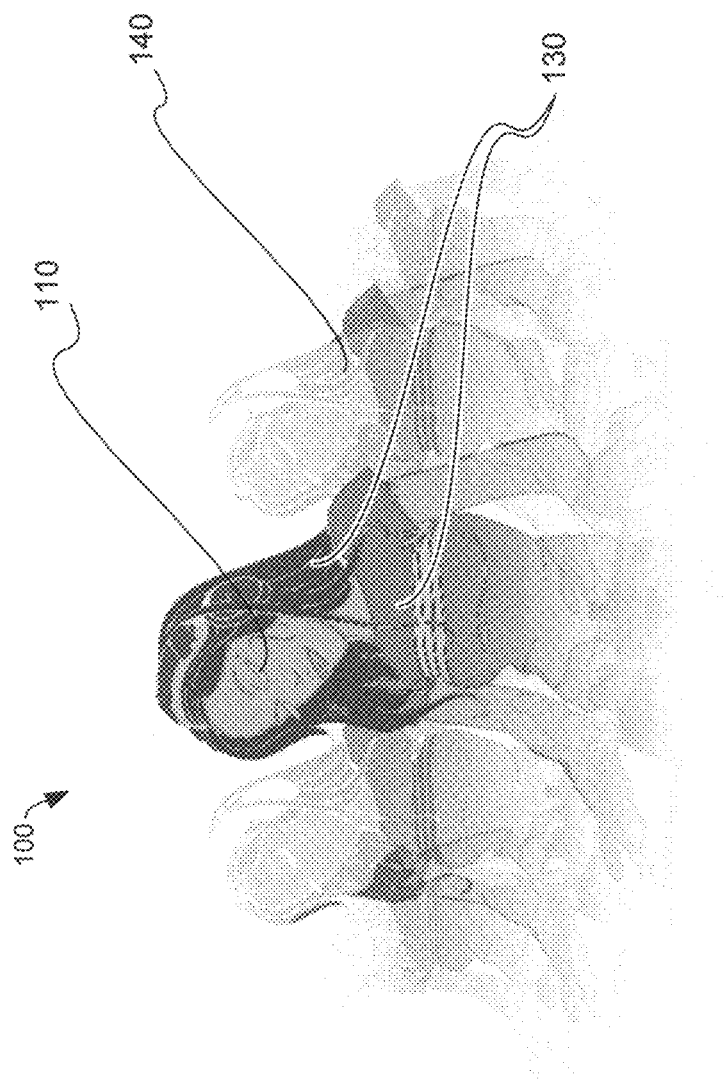
FIG. 1 illustrates an image with an opacity mask based on a prior art color range selection technique.
Figure 5:
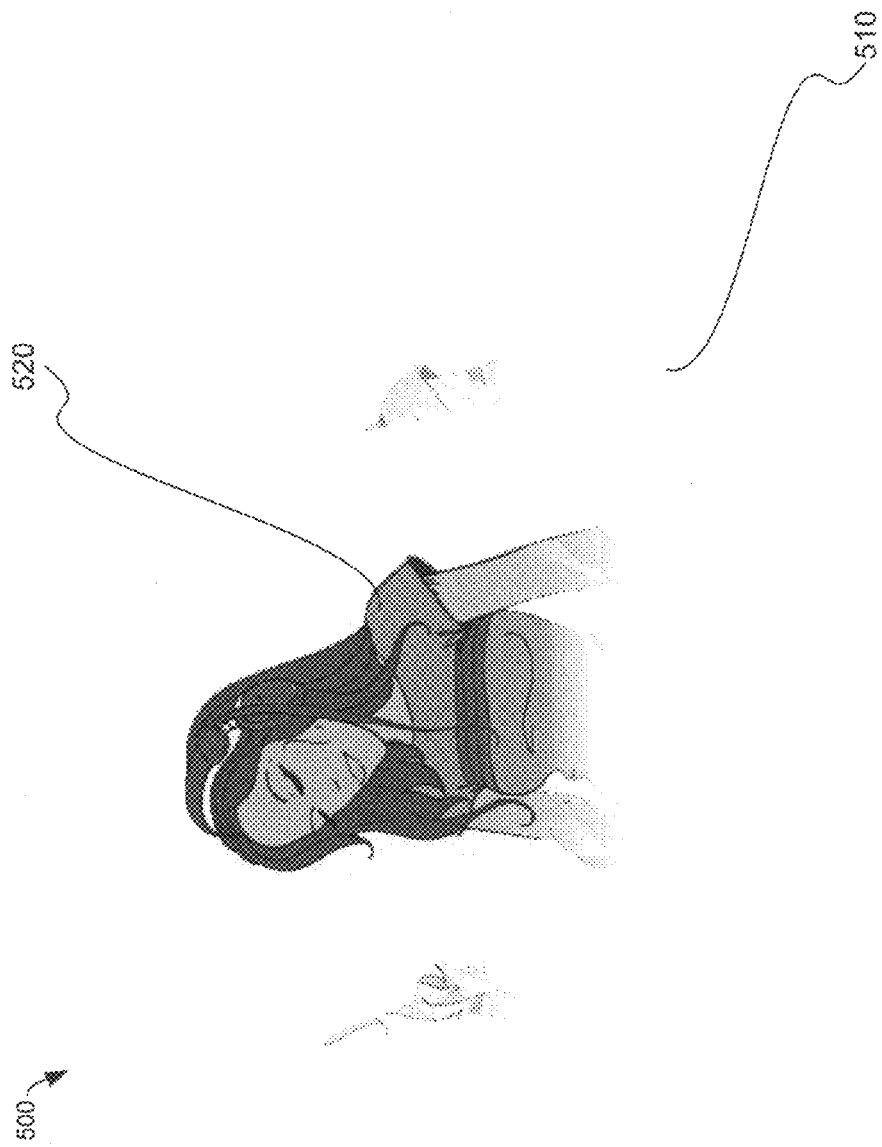
FIG. 5 illustrates the image in FIG. 2 where part of the image is highlighted.
Figure 6:
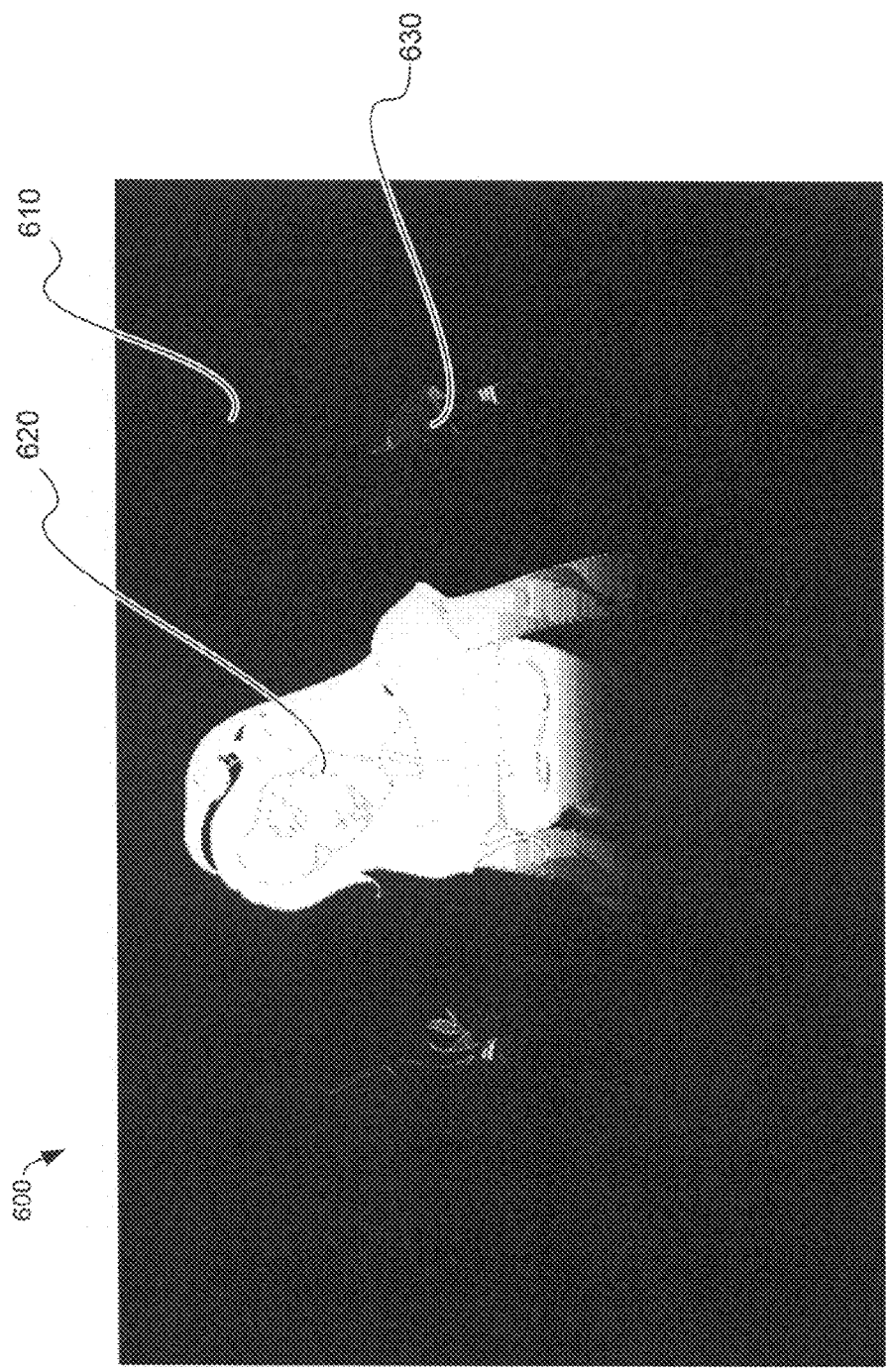
FIG. 6 illustrates a rendering of the opacity mask for the image in FIG. 5.

The opacity mask of an image can be visualized as a monochrome image where the intensity of each pixel reflects the opacity of each pixel (e.g., see FIG. 6). In other implementations, the opacity mask can be visualized by altering a rendering of the image to which opacity mask applies. For example, the opacity mask can be visualized by rendering the foreground areas of the image, as identified by the opacity mask, in full color while rendering background areas of the image without color (e.g., grey, black, or white as in FIG. 1 and FIG. 5). In other implementations, the areas of image that are predominantly foreground or background, as identified by the opacity mask, can be filtered by an image filter before rendering (e.g., background pixels are blurred or transformed from color to grayscale). Other depictions of the opacity mask are possible (e.g., depicting the opacity mask separately or drawing an animated dotted-line around areas in the image that identified as predominantly foreground or background). Rendering foreground and background pixels of the image differently allows users to distinguish the effect of their input on the opacity mask.

As is typical in many images, in the image 200 there are regions 230 that consist mostly of certain colors (e.g., orange and brown) and other regions 240 that consist of other colors (e.g., orange and brown with blue hues). There are also other areas in the image (e.g., hair, fur, fire, or transitions between semi-transparent or blurry objects), wherein pixels have colors in common with both regions (e.g., such as the respective regions of pixels identified by the background brushstrokes 220).

The identified pixels (e.g., covered by the brushstrokes 210 and 220) are used with a color model of opacity to determine an opacity mask for the image. A description of the color model and its derivation are illustrated below in reference to FIG. 3. The opacity mask describes, for each pixel in the image, the extent to which a pixel is in one of the two mutually exclusive states (e.g., foreground or background). In some implementations, the opacity of a pixel can be measured by a numerical value that typically ranges between 0 and 1, representing background and foreground, respectively. Other numerical scales are possible, for example, the value of opacity could range between 0 and 255.

The color model of opacity is based on a color-model-of-opacity function having the following general form, where c refers to the values of a particular pixel and i,j and k range over the quantity of values of the pixel (e.g., the number of color components, three for an RGB image or four for an CMYK image):

$$\text{opacity}(c) = w_0 + \sum_i w_{1i} c_i + \sum_{ij} w_{2ij} c_i c_j + \sum_{ijk} w_{3ijk} c_i c_j c_k + \cdots \quad (1)$$

Each summation is over the components, or combinations of components (e.g., ij is a combination of the color components i and j). For example, the general form of the function, applicable to the RGB color model can be expanded as:

$$\text{opacity}(r,g,b) = w_0 + w_1 r + w_2 g + w_3 b + w_4 r^2 + w_5 rg + w_6 rb + w_7 g^2 + w_8 gb + w_9 b^2 + \ldots$$

Although only the first ten terms of the function are given, the color-model-of-opacity function can have many more higher-order terms. In general, the color-model-of-opacity function is a sum of terms where each term is a product of a coefficient (e.g., $w_0$, $w_1$ and $w_2$) and a unique combination of color components (e.g., $r^2$, $gb^2$, or $g^3$). As terms are added, the degree of the equation increases. The function is non-linear whenever the degree of the function exceeds the number of color components (e.g., when a color component in a term is raised to a power of 2 or higher).

Figure 3:
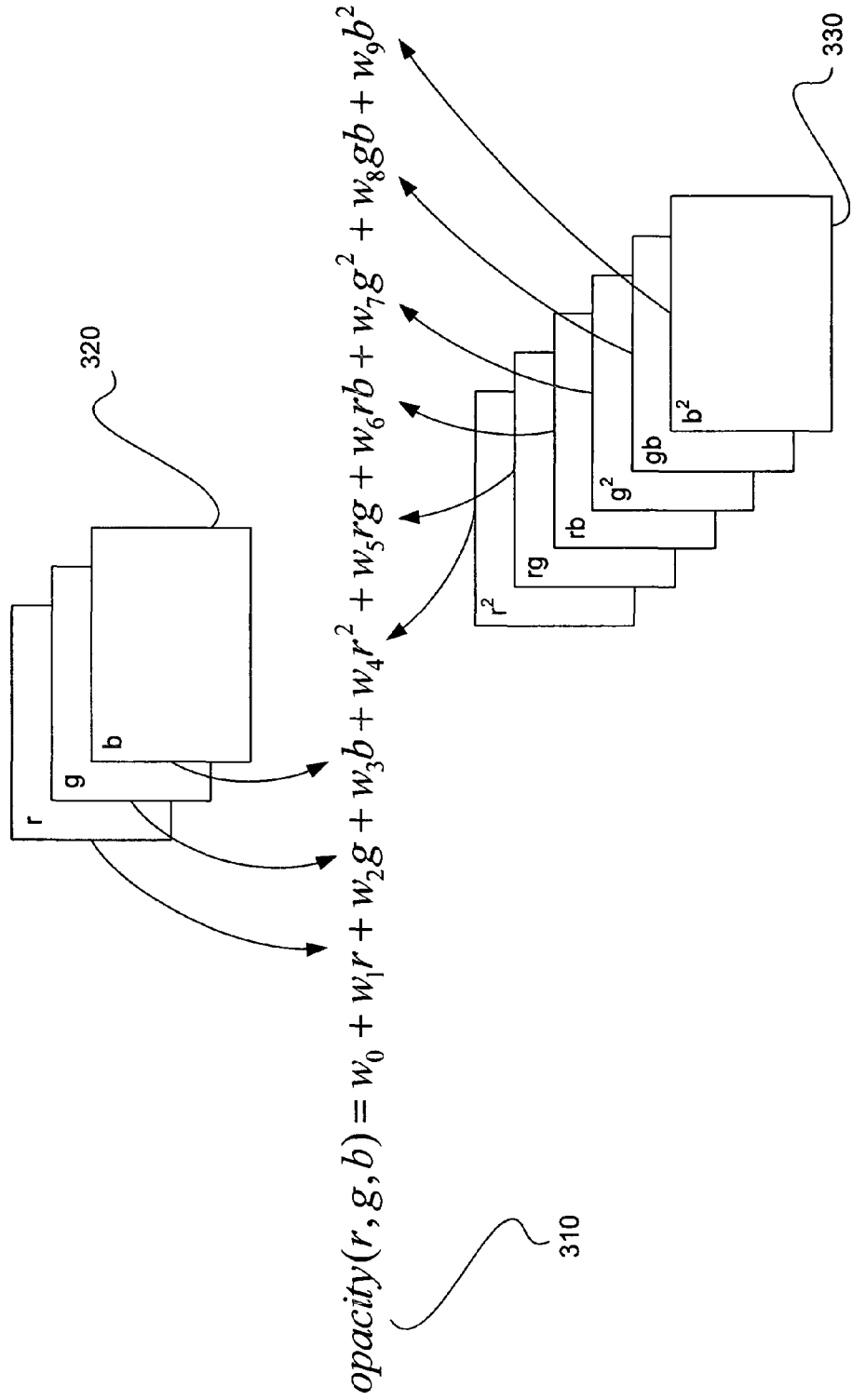
FIG. 3 illustrates the general form of the function for the color model of opacity.

FIG. 3 illustrates the contribution of color channels to the general form of the color-model-of-opacity function for an RGB color model. The function 310 is presented as above. Each color component of the pixels in an image can be represented as a color channel 320; sometimes also referred to as a color plane. Each lower-order term in the color-model-of-opacity function captures the contribution of individual color channels 320 to a pixel's opacity in an opacity mask. Higher-order terms in the function capture the contribution of a combination of color channels 330. For example, the 'rg' combination color channel is a combination of the red and green color channels. Color channels can be combined in arbitrarily complex combinations by including additional high-order terms in the color-model-of-opacity function.

Combining multiple color channels is analogous to practices that expert users commonly use to generate an opacity mask. For example, tools such as Photoshop from Adobe Systems Incorporated of San Jose, Calif., allow users to view the individual color channels of an image. To generate an image mask users will typically inspect each channel to subjectively evaluate what range of colors will produce a suitable opacity mask. To improve their mask, users may also combine one or more color channels in varying combinations in search of a suitable range of colors.

The number of terms in the color-model-of-opacity function can be pre-determined, automatically determined, user-customizable or vary among implementations. In some implementations, determining the number of terms in the color-model-of-opacity function can be based on user input. As the complexity (e.g., the number of terms) of the color model of opacity is increased, so too does the complexity of color component combinations in each higher order term. Each additional color component combination means the color model of opacity is more likely to yield an optimal partitioning of the colors and subsequently produce more accurate opacity values for pixels in the image.

To solve for a color model of opacity, values for the coefficients of the color-model-of-opacity function are derived based on the pixels identified as foreground and background. The values of coefficients of the model are selected to yield an ideal partitioning that separates foreground and background pixels.

Figure 4:
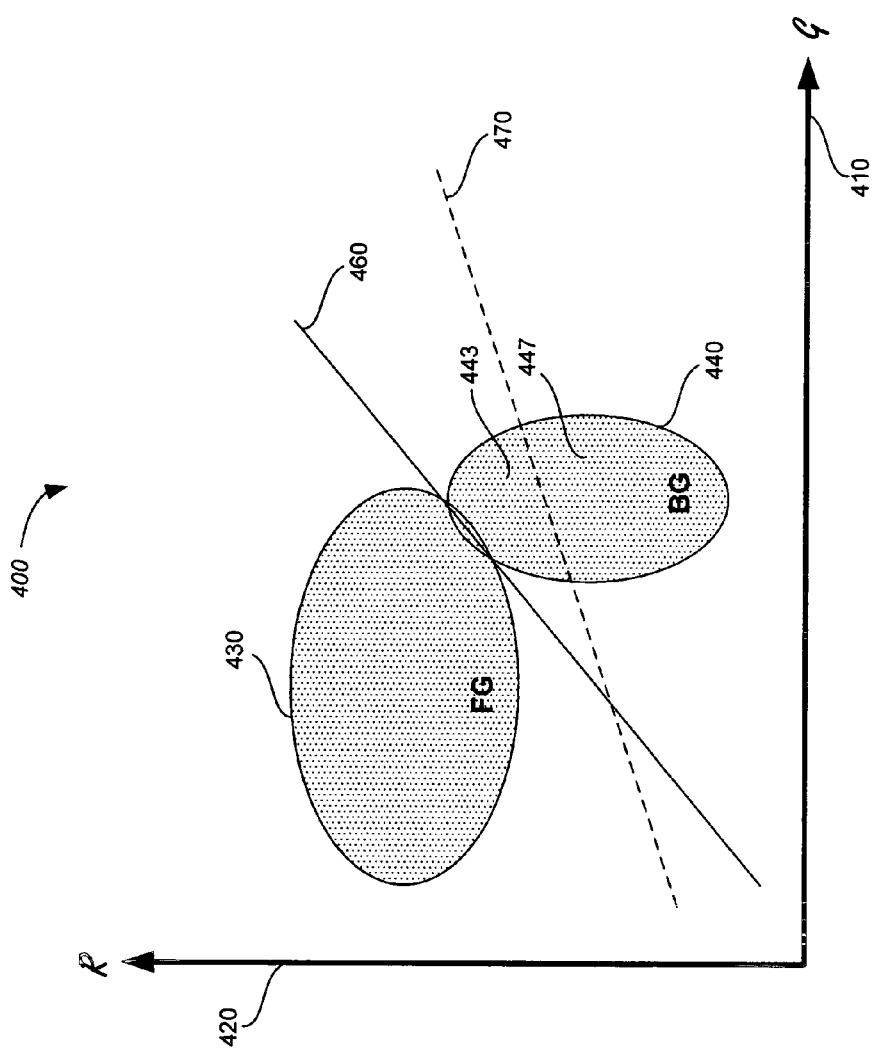
FIG. 4 is a graph plotting two color components of the foreground and background pixels.

FIG. 4 illustrates a two-dimensional graph 400 plotting two color components, red 420 and green 410, of the pixels identified by brushing foreground and background pixels of an image in RG color space. The graph 400 illustrates how values of the coefficients of the color model of opacity affect how foreground and background pixels are partitioned.

The graph 400 depicts two separate regions, one corresponding to the red/green values of foreground pixels 430, the other corresponding to the red/green values of background pixels 440. For illustrative purposes, the simplest color-model-of-opacity function for the RG color space will be used:

$$\text{opacity} = w_0 + w_1 r + w_2 g$$

Assigning values to the coefficients of the function determines the position and slope of the line (e.g., line 460 or line 470) that partitions the RG color space into two subspaces. For example, in graph 400, the line 470 represents one potential partitioning. However, the resultant foreground partition (e.g., the partition consisting mainly of foreground pixels) contains many background pixels 443. In comparison, line 460 represents a more ideal partitioning wherein most of the foreground pixels 430 and background pixels 440 are separated.

In general, the foreground and background regions may not be so easily partitioned by a straight line as suggested by graph 400. In general, however, the color model of opacity is a non-linear function that describes a curved n-dimensional hyper-surface in n-dimensional space, where n is the number of color components in the image. As the complexity the color model of opacity increases, so too does the function's expressiveness and so too is it likely that a set of values for each coefficient exists that ideally partitions foreground pixels from background pixels.

A partitioning that separates all the foreground pixels from all the background pixels may not be possible. If such a partition is not possible, then the ideal partition is a partitioning that minimizes partition error. Partition error of a particular partitioning can be measured by comparing the foreground pixels that are in the background partition and the background pixels that are in the foreground partition. The lower the partition error, the fewer pixels there are on the wrong side of their respective partition.

In particular, if the opacity of foreground pixels is equal to an opacity value of one (e.g., opacity=1) and the opacity of background pixels is equal to an opacity value of zero (e.g., opacity=0), then, in some implementations, the error of the partitioning is given by the following function, where capital letters denote vectors:

$$\text{error} = \frac{1}{2} \sum_{i_+} (1 - W \cdot X_i)^2 + \sum_{i_-} (W \cdot X_i)^2 \quad (1)$$

In the above function, the first summation is over each foreground pixel $i_+$ and the second summation is over each background pixel $i_-$. The variable W represents a vector of the coefficients from each term in the color-model-of-opacity function and X represents a vector of the pixel value combinations in each term in the color-model-of-opacity function. For example, for an RGB image and a color-model-of-opacity function with ten terms:

W={$w_0, w_1, w_2, w_3, w_4, w_5, w_6, w_7, w_8, w_9$} and

X={1, r, g, b, $r^2$, rg, rb, $b^2$, bg, $g^2$}.

In other implementations, the vector X can include non-local color-derived information, where the pixel value or component thereof (e.g., r, g or b) in the vector is a function of the pixel value of the pixels in a local neighborhood of pixels. For a given pixel, its local neighborhood can, for example, be the nearest four, eight, 12 or 24 pixels. For example, the r, g, and b color components in the above example can also include horizontal (x) and vertical (y) gradients of the color components (e.g., rx, ry, gx, gy, bx and by). Alternatively, or in addition to, each component can also include information such as the overall gradient magnitude, the neighborhood mean, median, bilateral filter value, or texture measures. All of these potential components can be combined with the color components to augment the nonlinear model of opacity. In this way, the opacity value at a pixel can incorporate higher level information such as local texture and edge information.

Differentiating the equation (1) and solving for W when error is minimized yields the following solution:

$$W = M^{-1} \cdot \sum_{i_+} X_i$$

where $M^{-1}$ is the inverse of the matrix M and where each i,j element in M is defined as:

$$M_{[i,j]} = \sum_{i_+} X_i X_j + \sum_{i_-} X_i X_j$$

The color model of opacity is derived by substituting the coefficients given in the vector W into the color-model-of-opacity function (1). The opacity value of each pixel in the image can be determined by simply evaluating the color model of opacity using the values associated with the pixel.

In some implementations, a bias parameter can be used to give either the background or foreground pixels more weight (e.g., favoring one or the other) while determining the value of coefficients for the color model of opacity. In such implementations, the bias β, can be incorporated into matrix M yielding:

$$M_{[i,j]} = \sum_{i_+} X_i X_j + \beta \sum_{i_-} X_i X_j$$

In the above equation, when the bias is large, the background pixels are favored. In contrast, when the bias is small, the foreground pixels are favored. Consider a pixel whose opacity value indicates that it is neither completely foreground nor complete background. The pixel will have an opacity value indicating that it is more foreground than background when the bias is small, rather than if the bias was large. Ideally, the bias parameter can be based on user input, affording users control to determine the relative weight of the background and foreground pixel identifications.

In some implementations, the color model of opacity can be constrained to assure that the pixels that are identified by users as foreground and background are identified as such during evaluation of the color model of opacity. A constrained color model of opacity, opacity', can be given as:

$$\text{opacity}'(i) = \min(\max(\text{opacity}(i), I_+(i)), 1 I_{31}(i))$$

In the above function, i, is the ith pixel in the image, and $I_+$ is a vector of foreground pixels wherein each element i is 1 if the ith pixel in the image is identified as a foreground pixel, and 0 otherwise. In the vector of background pixels $I_-$, each ith element is 1 if the ith pixel in the image is identified as a background pixel, and 0 otherwise. The constrained color model of opacity effectively sets the opacity value of pixels identified as foreground to 1 and the value of background pixels to 0, regardless of their opacity values as determined by the (unconstrained) color model of opacity.

Although users may identify both foreground and background pixels, it is not strictly necessary that both foreground pixels and background pixels be identified by users. In some implementations, identifying either foreground or background pixels is sufficient. In such implementations, if pixels of one state (e.g., foreground) are identified, then pixels of the other state (e.g., background) are automatically identified. The automatically identified pixels are used in lieu of receiving an explicit identification (e.g., by users or other identification apparatus or process, such as might be made as the result of an edge detection system). In the following discussion regarding automatic pixel selection, it is assumed that only foreground pixels have already been identified. Note, that the techniques regarding automatic identification, described below, also apply for automatically selecting foreground pixels if background pixels had been initially identified instead.

In some implementations, automatically identifying background pixels can include selecting pixels that are farthest away from the identified foreground pixels. For example, given a selection of foreground pixels in an upper left-hand region of the image, background pixels can be automatically identified from a border area in the lower right-hand region of the image. In some implementations, multiple pixels may be automatically identified within a pre-determined distance from the border area.

In some other implementations, pixels from the image can be randomly sampled and each of the sampled pixels compared to foreground pixels. The pixels from the sample whose color values are the least like the color values of the foreground pixels can be automatically identified as background pixels. The distance between the respective colors of two pixels in color space can be used to determine how similar or different the color of one pixel is to another pixel.

FIG. 5 illustrates a rendering 500 of an image 200 where part of the image is highlighted (e.g., the background is white 510) providing feedback to users about the opacity values of pixels in the image given the current identifications of foreground and background pixels. Note that the duplicate copies of the central figure in image 500 are more effectively removed compared to image 100. The area of the image that is in full color 520 suggests to users that pixels in the area have opacity values closer to 1 than to 0 (e.g., more foreground than background). In other implementations, the opacity values of pixels can be depicted by highlighting (e.g., in a semi-transparent colored highlight) the pixels based on their particular opacity values. Other depictions of the opacity mask are possible (e.g., drawing an animated dotted-line around areas of pixels that have an opacity value exceeding a pre-defined or user supplied threshold).

In some implementations, a rendering of the image that provides information about the resultant opacity mask can be updated continuously as users identify either foreground or background pixels. For example, the highlighted area in the image can be adjusted in response to each instance of user input received from the user (e.g., each movement of the mouse drawing the brushstroke). Typically, the coefficients of the color-model-of-opacity function can be determined and the opacity mask of the image evaluated as quickly as input is received. A rendering of the image indicating the current opacity mask provides users with live visual feedback allowing users to perceive how input is affecting the opacity mask. Live visual feedback allows users to efficiently and quickly achieve the desired opacity mask.

FIG. 6 illustrates a rendering 600 of the opacity mask for the image in FIG. 5, as determined from user input. In the rendering 600, areas of the image 610 that have opacity values near or at zero (e.g., background) are rendered as black. Areas of the image 620 that have opacity values near or at one (e.g., foreground) are rendered in white. Pixels such as those in area 630 which have opacity values between zero and one (e.g., somewhere between foreground and background) are rendered as grey in proportion to their respective opacity value.

Figure 7A:
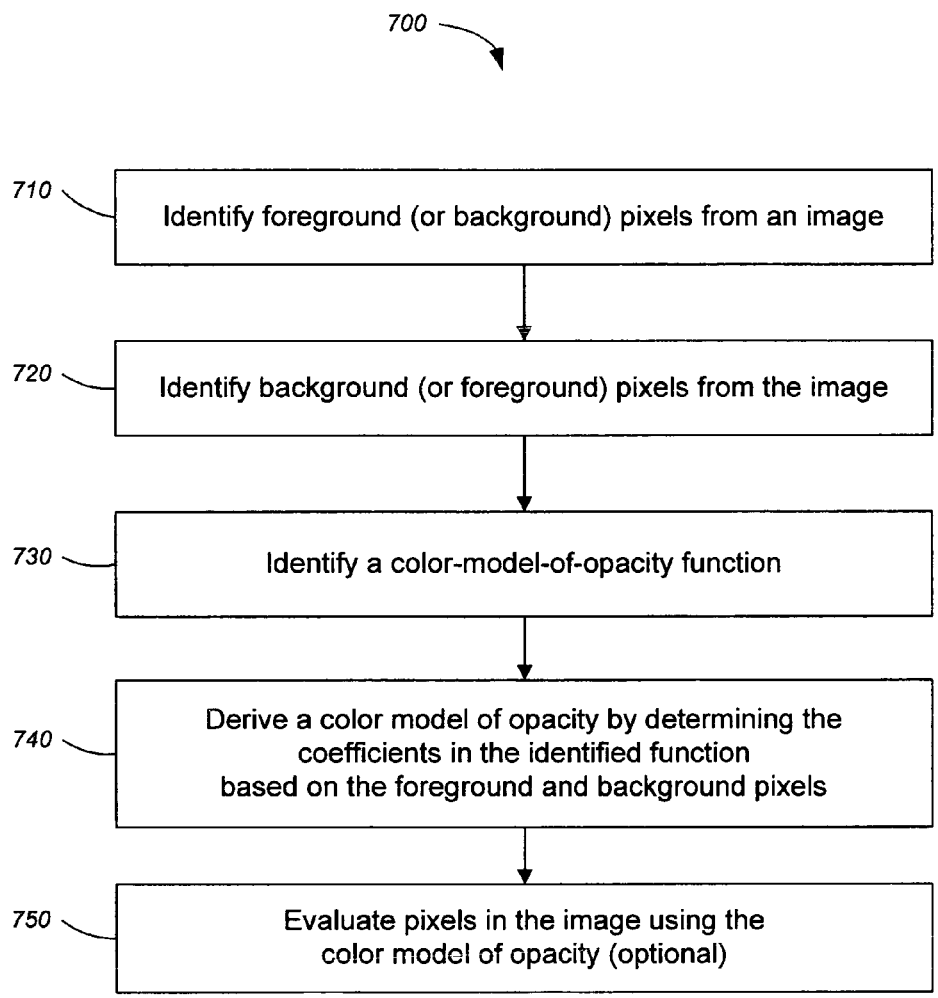
FIG. 7A is a flow diagram for determining the opacity value for a pixel in an image.

FIG. 7A is a flow diagram of a method 700 for determining the opacity value for a pixel in an image using a color model of opacity. The method 700 includes identifying pixels from an image that are either foreground or background (step 710). Typically, such pixels are identified based on received user input. For example, users can draw a foreground brushstroke over the image using a mouse and the pixels covered by the foreground brushstroke are identified as foreground pixels.

Alternatively, pixels may be identified by a vector path drawn on the image. A brush of a pre-determined or user-specified radius can be stroked along the path to identify pixels. An attributes of a pixel depends on the pixel's color or the pixel's position within the image. A threshold, or range, and one or more pixel attributes can be used to identify pixels in the image. For example, pixels can be identified based on their brightness, proximity to the image center, or color saturation. Pixels with attribute values less than a lower threshold may be identified as foreground (or background) and those with attribute values greater than an upper threshold may be identified as background (or foreground).

In another implementation, pixels can be identified from an initial image mask. The initial image mask can be identified by users, pre-defined (e.g., based on a template), or automatically determined. If the initial mask is a binary mask, the binary mask can be blurred with a Gaussian or other blurring function to generate an initial opacity mask. Pixels with opacity less than a lower threshold may be identified as background (or foreground) while pixels with opacity greater than an upper threshold may be identified as foreground (or background).

In response to identifying foreground pixels, the method 700 includes identifying background pixels (step 720). In some implementations, the background pixels can be identified by user input in the same way that foreground pixels are identified (e.g., by brushing over the image). Alternatively, background pixels can automatically be identified based on the location of the foreground pixels in the image or the pixels' color values. Step 720 is described as identifying background pixels in response to identifying foreground pixels. However, if, instead background pixels are identified in step 710, then foreground pixels can be identified in step 720 in the same fashion.

The method 700 includes identifying a color-model-of-opacity function with a fixed number of terms (step 730). The number of terms in the function can be pre-determined or can be received from users or can be automatically determined. In one implementation, users can specify and manipulate such a parameter before, during or after the identification of foreground and background pixels. For example, the number of terms in the color-model-of-opacity function may initially be pre-determined according to a default value. In response to receiving an identification of foreground and background pixels, an initial opacity mask can be determined (see the following steps) by method 700. Users may provide user input affecting (e.g., increasing or decreasing) the number of terms in the color-model-of-opacity function. In response, a new opacity mask is determined from the new color-model-of-opacity function.

Using the identified color-model-of-opacity function, method 700 includes determining the coefficients of the function according to the foreground and background pixels identified earlier (step 740). The coefficients of the function can be derived by minimizing a function that measures the error of partitioning the foreground pixels from the background pixels in the color space of the image with the color model of opacity.

The method 700 can include using the color model of opacity to evaluate every pixel in the image to determine an opacity value for each evaluated pixel (step 750). The opacity values of all the pixels in the image constitute an opacity mask. The opacity mask can be used, for example, to limit the effect of subsequent image manipulation operations. For example, pixels can be subject to a filter, such as color tinting, color adjustment, blurring and the like, depending on the pixel's opacity value. In another example, the opacity mask is used to select pixels within the image (e.g., the foreground pixels, or pixels with an opacity value greater than a particular threshold value).

In some implementations, the results of evaluating the color model can also be used as an input to other image processing techniques. For example, the opacity values of a pixel can be used in combination with coherent classification, as described in U.S. patent application Ser. No. 11/517,189, entitled LIVE COHERENT IMAGE SELECTION, to inventors Gregg Wilensky, Scott Cohen and Jen-Chan Chien, which was filed on Sep. 6, 2006. In such an implementation, in lieu of using a constant value to determine the regional costs of classifying a pixel as either foreground or background, the regional cost can be a function of the pixel's opacity. The cost function used to coherently classify pixels in an image can be modified so that regional costs associated with classifying a pixel i as either foreground or background, are described by the following functions, respectively:

$$\epsilon_i^+ = \log(1/\text{opacity}(i)) \text{ and } \epsilon_i^- = \log(1/(1-\text{opacity}(i)))$$

Using the color model of opacity in combination with coherent classification advantageously produces expansive selections where large portions of the image can be selected from relatively few identified pixels (e.g., user input brushing the image). In general, the opacity value of pixels in the image can be determined rapidly enough that the combined techniques can be used to repeatedly and continuously to generate and render the selection as user input is received.

Figure 7B:
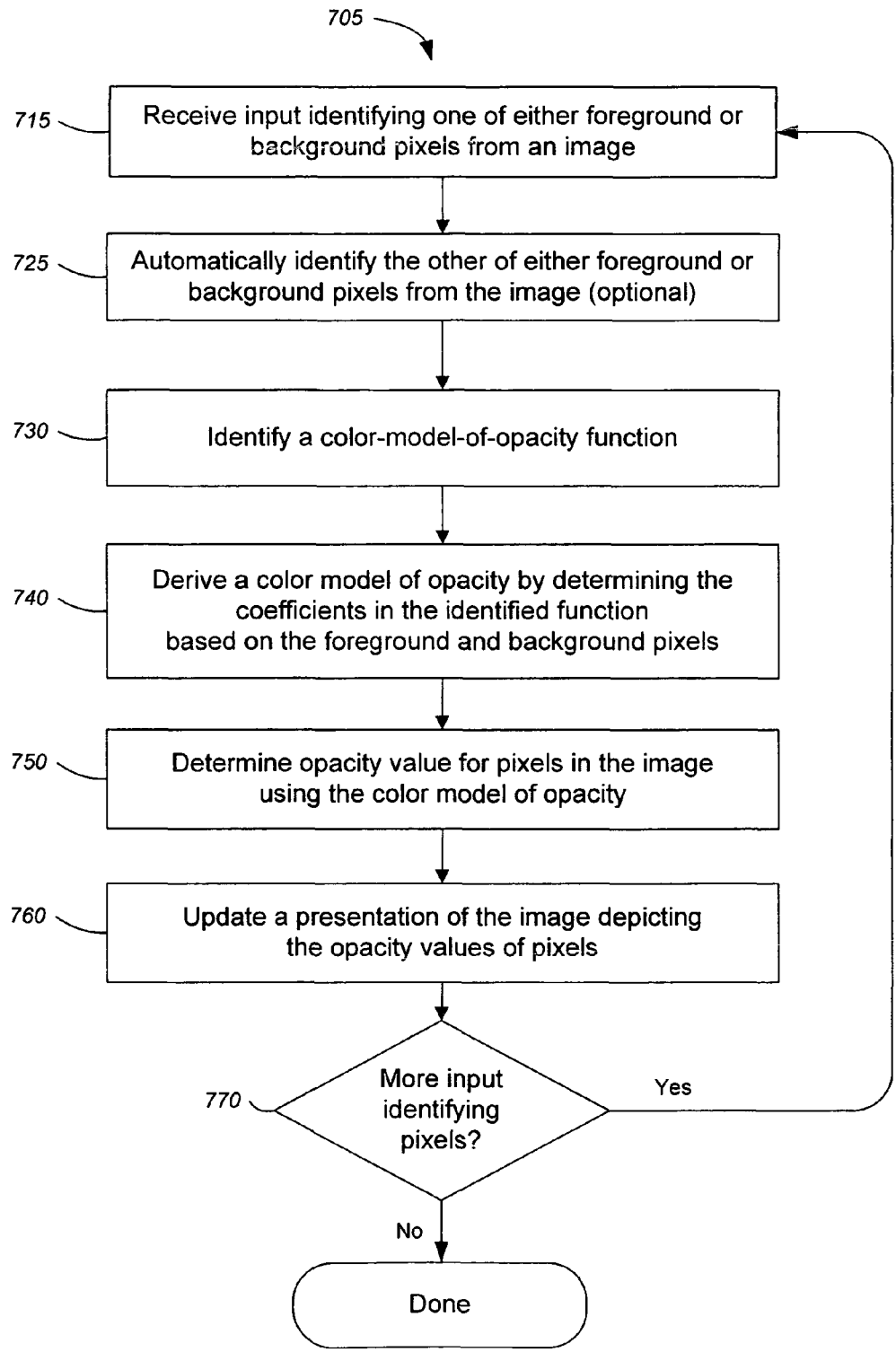
FIG. 7B is a flow diagram for determining the opacity value for a pixel in an image while receiving user input.

FIG. 7B is a flow diagram of a method 705 for determining the opacity value for a pixel in an image while receiving user input. The method 705 includes receiving input from users that identifies pixels from the image, where the input identifies pixels as one of either foreground or background (step 715). Pixels can be automatically identified as either background or foreground (step 725), respective of the user input (e.g., if foreground pixels are being identified by the user input, then background pixels are automatically identified). If both foreground and background pixels have already been identified by users (e.g., by previously received user input), then it may not be necessary to automatically identify any pixels from the image.

From the identified foreground and background pixels, a color-model-of-opacity function is identified, the function's coefficients are determined, and the function is used to determine the opacity value of pixels in the image (steps 730-750) in the same fashion as described in reference to FIG. 7A.

The presentation of the image can be updated to depict the current opacity value of pixels in the image (step 760). For example, pixels in the background can be obfuscated (e.g., rendered in a grey, or colored hue proportional to their opacity value). Updating the presentation allows users to discern the resultant opacity mask and adjust their input accordingly.

In some implementations, determining the opacity values of pixels and updating the rendering of the image occurs as the user input is received. If additional input identifying pixels is received from the user (step 770), then that further input is received and processed (return to step 715). When the desired opacity mask has been reached, the opacity mask can, in general, be used for subsequent image processing operations (e.g., selection or transforming) which is typically in proportion to opacity mask values (e.g., only foreground pixels are subject to the full operation).

Figure 8:
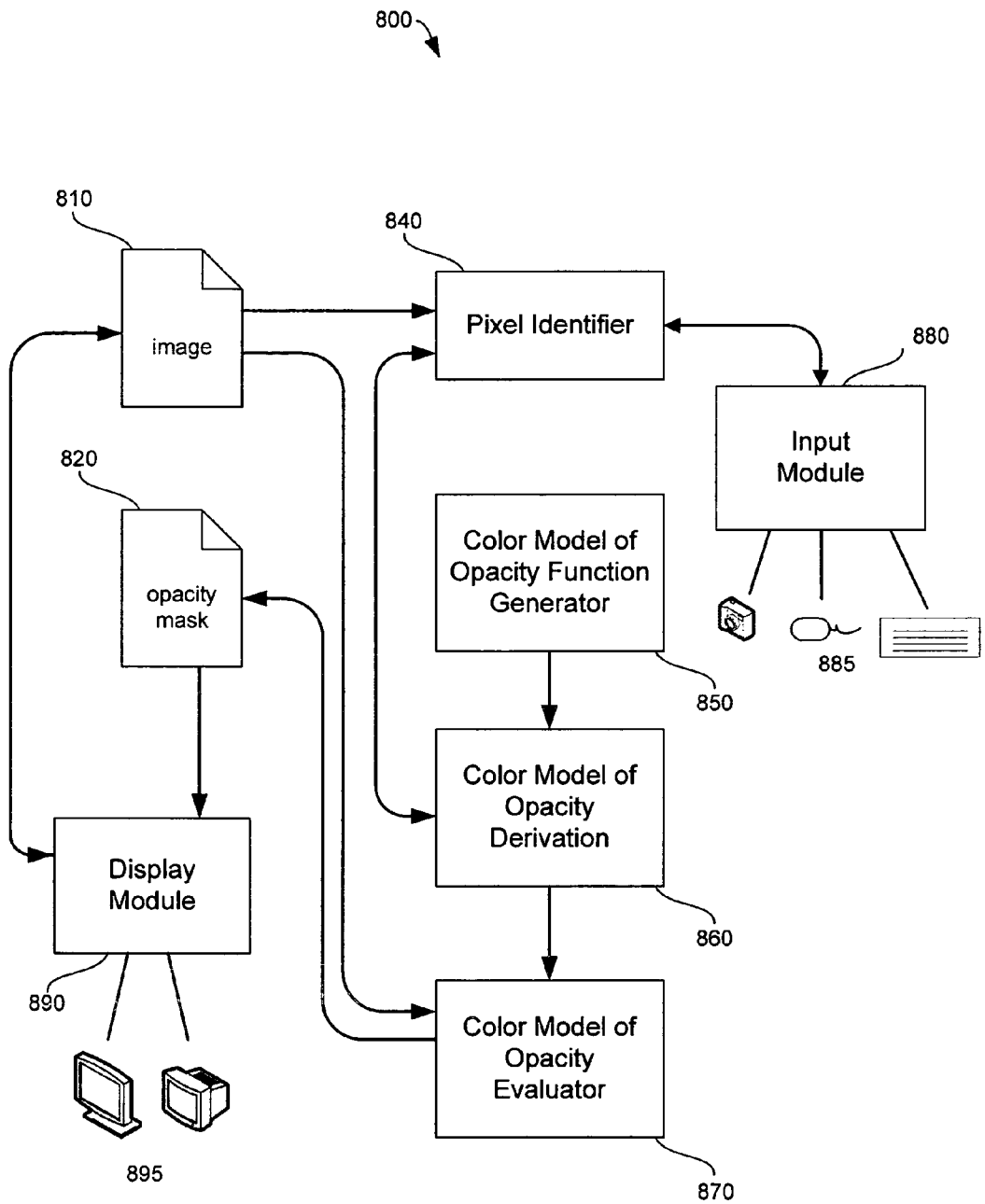
FIG. 8 illustrates a system for determining an opacity mask for an image.

FIG. 8 illustrates a system 800 for using a non-linear color model of opacity to determine an opacity mask for an image. The system 800 generally consists of modules (e.g., module 840 through 890) and resources (e.g., resource 810 and 820). A module is typically a unit of distinct functionality that can provide and receive information to and from other modules. Modules can facilitate communication with input or output devices (e.g., display module 890 or input module 880). Modules can operate on resources. A resource is a collection of information that can be operated on by a module.

The system 800 includes an image 810 containing the pixels for which opacity values can be determined. The opacity values for every pixel in the image 810 constitute an opacity mask 820. The opacity mask 820 can be a separate resource from the image 810, however, in some implementations, the opacity mask can be represented within the image resource 810.

The system 800 includes an input module 880 for receiving pixel identifications from users (e.g., foreground and background pixels). The input module 880 can receive input from one or more input devices 885 (e.g., keyboard or mouse). The input module 880 can also determine the particular state of the pixel identifications (e.g., foreground or background). For example, the identification can be based on the state of a device such as the state of a keyboard key, whether the left or right mouse button is being used, or the type of pen providing input to the tablet device. In other implementations, the input module 880 can determine pixel identifications based on edge or movement detection in the images received from a camera 880.

The pixel identifier 840 can receive the identified pixels from the input module 880. The pixel identifier 840 can automatically identify pixels in the image having an opposite identification from the pixels received from the input module 880. Information that identifies both the foreground and background pixels in the image can be provided to the color module of opacity derivation module 860.

The color-model-of-opacity function generator 850 identifies a particular color-model-of-opacity function having a particular number of terms. In one implementation, the module 850 can receive user input from the input processor to determine the number of terms in the function. The particular color-model-of-opacity function is provided to the color model of opacity derivation module 860.

The color model of opacity derivation module 860 uses the pixel identifications and the color-model-of-opacity function to derive the color model of opacity for the image. Deriving the color model of opacity requires determining the coefficients of the color-model-of-opacity function that fit the foreground and background pixel identifications. The color model of opacity is provided to the color model of opacity evaluator module 870.

The color model of opacity evaluator module 870 accesses the image 810 and evaluates each pixel in the image 810 using the color model of opacity derived by module 860. Evaluating the color model of opacity for a pixel generates an opacity value for the pixel. The pixel's opacity value can be stored in the opacity mask 820.

Information from the opacity mask 820 and information about the image 810 can be used by the display module 890 to generate a visual rendering of the opacity mask and the image (e.g., so that pixels having background opacity values are highlighted or obfuscated). In some implementations, information from the pixel identifier 840 can also be used to render the pixels identified by the user (e.g., paint the brushstrokes over the image). The display module 890 can be connected to one or more display devices 895.

The system 800 describes one potential implementation for generating an opacity mask from a non-linear color model of opacity. In general, modules and resources can be combined or divided and implemented in some combination of hardware or software on one or more computing devices connected by one or more networks.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method comprising:
identifying a first plurality of pixels in a raster image as foreground pixels and a distinct second plurality of pixels in the raster image as background pixels, each of the foreground pixels and background pixels having a respective color value;
solving for a color model of opacity, including determining coefficients of the color model of opacity using the color values of the foreground pixels and the color values of the background pixels, where the color model of opacity is a function that determines an opacity for a given pixel from a sum of products of color components of the respective color value of the given pixel, each product weighted by one of the coefficients, where the coefficients are determined so as to minimize error in a partition of the foreground and background pixels, and where the error is measured based on the foreground pixels that are in a background partition and the background pixels that are in a foreground partition; and
determining an opacity value for a pixel in the raster image using the color model of opacity;
wherein solving is performed by one or more processors.

2. The method of claim 1, where:
the color model of opacity is non-linear.

3. The method of claim 1, where:
the color value of a pixel includes non-local information based on the color value of pixels in a local neighborhood around the pixel.

4. The method of claim 1, further comprising:
producing an opacity mask for the raster image based on the opacity value of each pixel in the raster image.

5. The method of claim 1, where:
the function is a sum of a plurality of products of respective coefficients of the color model of opacity and respective monomials each monomial having one or more variables corresponding to each component of the given pixel's color value.

6. The method of claim 1, where determining the opacity value for the pixel in the raster image using the color model of opacity further comprises:
evaluating the color model of opacity using the pixel's color value.

7. The method of claim 1, where solving for the color model of opacity further comprises:
using a bias to favor either the color values of the foreground pixels or the color values of the background pixels.

8. The method of claim 7, further comprising:
receiving user input determining the bias.

9. The method of claim 1, further comprising:
receiving user input specifying a complexity of the color model of opacity.

10. The method of claim 9, where:
the complexity of the color model of opacity determines a number of color combinations used in the color model of opacity.

11. The method of claim 1, further comprising:
coherently classifying pixels in the raster image as either foreground or background based on the color model of opacity.

12. The method of claim 1, where identifying the first plurality of pixels in the raster image includes:
receiving user input identifying pixels from the image as the first plurality of pixels.

13. The method of claim 1, where identifying the distinct second plurality of pixels in the raster image includes one or more of the following steps:
receiving user input identifying pixels from the image as the second plurality of pixels;
selecting pixels along the border of the image as the second plurality of pixels;
selecting pixels by random sample as the second plurality of pixels; and
selecting pixels as the second plurality of pixels whose color values are most unlike the color value of pixels in the first plurality of pixels.

14. A computer-implemented method comprising:
receiving user input identifying a first plurality of pixels in a raster image as one of foreground pixels or background pixels, each of the pixels in the raster image having a respective color value;
identifying a distinct second plurality of pixels in the raster image as the other of the foreground pixels or the background pixels, each of the pixels in the distinct second plurality of pixels having a respective color value;
solving for a color model of opacity, including determining coefficients of the color model of opacity using the color values of the foreground pixels and the color values of the background pixels, where the color model of opacity is a function that determines an opacity for a pixel based on the respective color value of the pixel, where the function is a sum of products of color components of the respective color value of the pixel, each product weighted by one of the coefficients, where the coefficients are determined so as to minimize error in a partition of the foreground and background pixels, and where the error is measured based on the foreground pixels that are in a background partition and the background pixels that are in a foreground partition; and
producing an opacity mask for the raster image by using the color model of opacity to determine a respective opacity value for each of the pixels of the raster image;
wherein the solving is performed by one or more processors.

15. The method of claim 14, where:
the color model of opacity is non-linear.

16. The method of claim 14, where:
the function is a sum of a plurality of products of respective coefficients of the color model of opacity and respective monomials, each monomial having one or more variables corresponding to each component of the given pixel's color value.

17. The method of claim 14, where determining the opacity value for a pixel in the raster image using the color model of opacity comprises:
evaluating the color model of opacity using the pixel's color value.

18. The method of claim 14, further comprising:
updating a presentation of the raster image on a display to depict the opacity mask as the first plurality of pixels are being identified.

19. The method of claim 14, where receiving user input identifying the first plurality of pixels further comprises:
receiving a stroke drawn over the image.

20. The method of claim 19, where each pixel covered by the stroke drawn over the image is in the first plurality of pixels.

21. The method of claim 14, where identifying the distinct second plurality of pixels in the raster image includes one or more of the following steps:
receiving user input identifying pixels from the image as the second plurality of pixels;
selecting pixels along the border of the image as the second plurality of pixels;
selecting pixels by random sample as the second plurality of pixels; and
selecting pixels as the second plurality of pixels whose color values are most unlike the color value of pixels in the first plurality of pixels.

22. A computer program product, encoded on a machine-readable storage device or machine-readable storage substrate, operable to cause data processing apparatus to perform operations comprising:
identifying a first plurality of pixels in a raster image as foreground pixels and a distinct second plurality of pixels in the raster image as background pixels, each of the foreground pixels and background pixels having a respective color value;
solving for a color model of opacity, including determining coefficients of the color model of opacity using the color values of the foreground pixels and the color values of the background pixels, where the color model of opacity is a function that determines an opacity for a pixel based on the respective color value of the pixel, where the function is a sum of products of color components of the respective color value of the pixel, each product weighted by one of the coefficients, where the coefficients are determined so as to minimize error in a partition of the foreground and background pixels, where the error is measured based on the foreground pixels that are in a background partition and the background pixels that are in a foreground partition; and
determining an opacity value for a pixel in the raster image using the color model of opacity.

23. The computer program product of claim 22, where:
the color model of opacity is non-linear.

24. The computer program product of claim 22, where:
the color value of a pixel includes non-local information based on the color value of pixels in a local neighborhood around the pixel.

25. The computer program product of claim 22, further operable to cause data processing apparatus to perform operations comprising:
producing an opacity mask for the raster image based on the opacity value of each pixel in the raster image.

26. The computer program product of claim 22 where:
function is a sum of a plurality of products of respective coefficients of the color model of opacity and respective monomials, each monomial having one or more variables corresponding to each component of the given pixel's color value.

27. The computer program product of claim 22, where determining the opacity value for the pixel in the raster image using the color model of opacity further comprises:
evaluating the color model of opacity using the pixel's color value.

28. The computer program product of claim 22, where solving for the color model of opacity further comprises:
using a bias to favor either the color values of the foreground pixels or the color values of the background pixels.

29. The computer program product of claim 28, further operable to cause data processing apparatus to perform operations comprising:
receiving user input determining the bias.

30. The computer program product of claim 22, further operable to cause data processing apparatus to perform operations comprising:
receiving user input specifying a complexity of the color model of opacity.

31. The computer program product of claim 30, where:
the complexity of the color model of opacity determines a number of color combinations used in the color model of opacity.

32. The computer program product of claim 22, further operable to cause data processing apparatus to perform operations comprising:
coherently classifying pixels in the raster image as either foreground or background based on the color model of opacity.

33. The computer program product of claim 22, where identifying the first plurality of pixels in the raster image includes:
receiving user input identifying pixels from the image as the first plurality of pixels.

34. The computer program product of claim 22, where identifying the distinct second plurality of pixels in the raster image includes one or more of the following steps:
receiving user input identifying pixels from the image as the second plurality of pixels;
selecting pixels along the border of the image as the second plurality of pixels;
selecting pixels by random sample as the second plurality of pixels; and
selecting pixels as the second plurality of pixels whose color values are most unlike the color value of pixels in the first plurality of pixels.

35. A computer program product, encoded on a machine readable storage device or machine readable storage substrate, operable to cause data processing apparatus to perform operations comprising:
receiving user input identifying a first plurality of pixels in a raster image as one of foreground pixels or background pixels, each of the pixels in the raster image having a respective color value;
identifying a distinct second plurality of pixels in the raster image as the other of the foreground pixels or the background pixels, each of the pixels in the distinct second plurality of pixels having a respective color value;
solving for a color model of opacity, including determining coefficients of the color model of opacity using the color values of the foreground pixels and the color values of the background pixels, where the color model of opacity is a function that determines an opacity for a pixel based on the respective color value of the pixel, where the function is a sum of products of color components of the respective color value of the pixel, each product weighted by one of the coefficients, where the coefficients are determined so as to minimize error in a partition of the foreground and background pixels, where the error is measured based on the foreground pixels that are in a background partition and the background pixels that are in a foreground partition; and producing an opacity mask for the raster image by using the color model of opacity to determine a respective opacity value for each of the pixels of the raster image.

36. The computer program product of claim 35, where:
the color model of opacity is non-linear.

37. The computer program product of claim 35, where:
the function is a sum of a plurality of products of respective coefficients of the color model of opacity and respective monomials, each monomial having one or more variables corresponding to each component of the given pixel's color value.

38. The computer program product of claim 35, where determining the opacity value for a pixel in the raster image using the color model of opacity comprises:
evaluating the color model of opacity using the pixel's color value.

39. The computer program product of claim 35, further operable to cause data processing apparatus to perform operations comprising:
updating a presentation of the raster image on a display to depict the opacity mask as the first plurality of pixels are being identified.

40. The computer program product of claim 35, where receiving user input identifying the first plurality of pixels further comprises:
receiving a stroke drawn over the image.

41. The computer program product of claim 40, where:
each pixel covered by the stroke drawn over the image is in the first plurality of pixels.

42. The computer program product of claim 35, where identifying the distinct second plurality of pixels in the raster image includes one or more of the following steps:
receiving user input identifying pixels from the image as the second plurality of pixels;
selecting pixels along the border of the image as the second plurality of pixels;
selecting pixels by random sample as the second plurality of pixels; and
selecting pixels as the second plurality of pixels whose color values are most unlike the color value of pixels in the first plurality of pixels.

43. A system comprising:
a display device;
a computer program product encoded on a computer-readable storage device or machine readable storage substrate;
one or more processors configured to execute the program product and perform operations comprising:
identifying a first plurality of pixels in a raster image as foreground pixels and a distinct second plurality of pixels in the raster image as background pixels, each of the foreground pixels and background pixels having a respective color value;
solving for a color model of opacity, including determining coefficients of the color model of opacity using the color values of the foreground pixels and the color values of the background pixels, where the color model of opacity is a function that determines an opacity for a pixel based on the respective color value of the pixel, where the function is a sum of products of color components of the respective color value of the pixel, each product weighted by one of the coefficients, where the coefficients are determined so as to minimize error in a partition of the foreground and background pixels, where the error is measured based on the foreground pixels that are in a background partition and the background pixels that are in a foreground partition; and
determining an opacity value for a pixel in the raster image using the color model of opacity.

44. The system of claim 43, where:
the color model of opacity is non-linear.

45. The system of claim 43, where:
the color value of a pixel includes non-local information based on the color value of pixels in a local neighborhood around the pixel.

46. The system of claim 43, where the one or more processors are configured to perform operations further comprising:
producing an opacity mask for the raster image based on the opacity value of each pixel in the raster image.

47. The system of claim 43, where:
the function is a sum of a plurality of products of respective coefficients of the color model of opacity and respective monomials, each monomial having one or more variables corresponding to each component of the given pixel's color value.

48. The system of claim 43, where determining the opacity value for the pixel in the raster image using the color model of opacity further comprises:
evaluating the color model of opacity using the pixel's color value.

49. The system of claim 43, where solving for the color model of opacity further comprises:
using a bias to favor either the color values of the foreground pixels or the color values of the background pixels.

50. The system of claim 49, where the one or more processors are configured to perform operations further comprising:
receiving user input determining the bias.

51. The system of claim 43, where the one or more processors are configured to perform operations further comprising:
receiving user input specifying a complexity of the color model of opacity.

52. The system of claim 51, where:
the complexity of the color model of opacity determines a number of color combinations used in the color model of opacity.

53. The system of claim 43, where the one or more processors are configured to perform operations further comprising:
coherently classifying pixels in the raster image as either foreground or background based on the color model of opacity.

54. The system of claim 43, where identifying the first plurality of pixels in the raster image includes:
receiving user input identifying pixels from the image as the first plurality of pixels.

55. The system of claim 43, where identifying the distinct second plurality of pixels in the raster image includes one or more of the following:
receiving user input identifying pixels from the image as the second plurality of pixels;
selecting pixels along the border of the image as the second plurality of pixels;
selecting pixels by random sample as the second plurality of pixels; and
selecting pixels as the second plurality of pixels whose color values are most unlike the color value of pixels in the first plurality of pixels.

56. A system comprising:
a display device;
a computer program product encoded on a computer-readable storage device or machine readable storage substrate;
one or more processors configured to execute the program product and perform operations comprising:
- receiving user input identifying a first plurality of pixels in a raster image as one of foreground pixels or background pixels, each of the pixels in the raster image having a respective color value;
- identifying a distinct second plurality of pixels in the raster image as the other of the foreground pixels or the background pixels, each of the pixels in the distinct second plurality of pixels having a respective color value;
- solving for a color model of opacity, including determining coefficients of the color model of opacity using the color values of the foreground pixels and the color values of the background pixels, where the color model of opacity is a function that determines an opacity for a pixel based on the respective color value of the pixel, where the function is a sum of products of color components of the respective color value of the pixel, each product weighted by one of the coefficients, where the coefficients are determined so as to minimize error in a partition of the foreground and background pixels, where the error is measured based on the foreground pixels that are in a background partition and the background pixels that are in a foreground partition; and
- producing an opacity mask for the raster image by using the color model of opacity to determine a respective opacity value for each of the pixels of the raster image.

57. The system of claim 56, where:
the color model of opacity is non-linear.

58. The system of claim 56, where:
the function is a sum of a plurality of products of respective coefficients of the color model of opacity and respective monomials, each monomial having one or more variables corresponding to each component of the given pixel's color value.

59. The system of claim 56, where determining the opacity value for a pixel in the raster image using the color model of opacity comprises:
evaluating the color model of opacity using the pixel's color value.

60. The system of claim 56, where the one or more processors are configured to perform operations further comprising:
updating a presentation of the raster image on a display to depict the opacity mask as the first plurality of pixels are being identified.

61. The system of claim 56, where receiving user input identifying the first plurality of pixels further comprises:
receiving a stroke drawn over the image.

62. The system of claim 61, where each pixel covered by the stroke drawn over the image is in the first plurality of pixels.

63. The system of claim 56, where identifying the distinct second plurality of pixels in the raster image includes one or more of the following:
- receiving user input identifying pixels from the image as the second plurality of pixels;
- selecting pixels along the border of the image as the second plurality of pixels;
- selecting pixels by random sample as the second plurality of pixels; and
- selecting pixels as the second plurality of pixels whose color values are most unlike the color value of pixels in the first plurality of pixels.

* * * * *